(No Model.)

L. HAAS.
CULINARY UTENSIL.

No. 278,939. Patented June 5, 1883.

WITNESSES
Chas. R. Burr
W. E. Bowen

INVENTOR
Levi Haas
By Myers & Co
Attorneys

UNITED STATES PATENT OFFICE.

LEVI HAAS, OF CHESTER, PENNSYLVANIA.

CULINARY UTENSIL.

SPECIFICATION forming part of Letters Patent No. 278,939, dated June 5, 1883.

Application filed November 16, 1882. (No model.)

*To all whom it may concern:*

Figure 1:
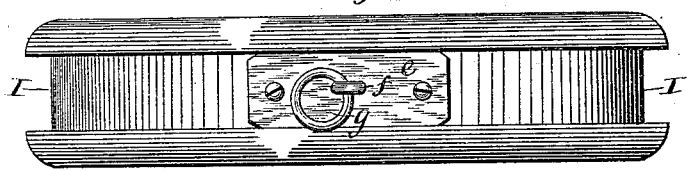
Figure 2:
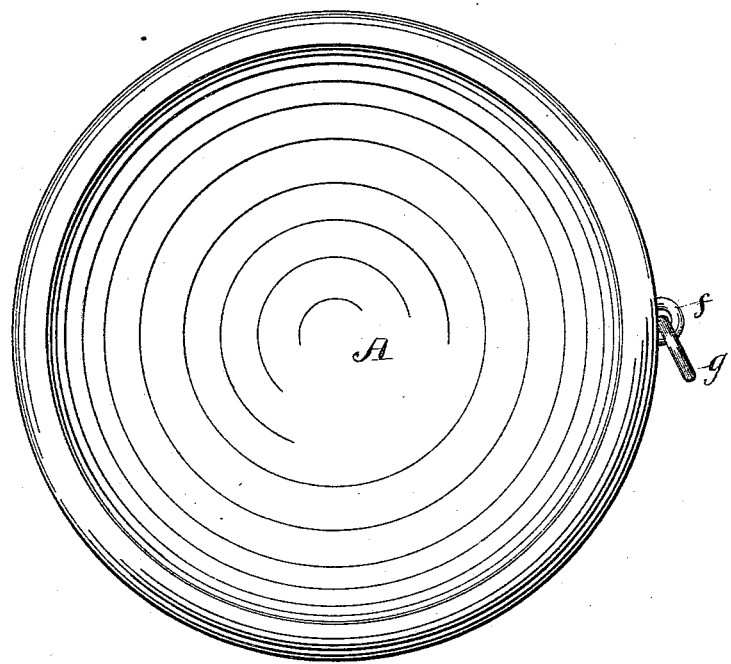

Be it known that I, LEVI HAAS, a citizen of the United States of America, residing at Chester, in the county of Delaware and State of Pennsylvania, have invented certain new and useful Improvements in Culinary Utensils, of which the following is a specification, reference being had therein to the accompanying drawing, in which—
Figure 1 is a side elevation of the utensil; Fig. 2, a top view, and Fig. 3 a cross-section.

Figure 3:
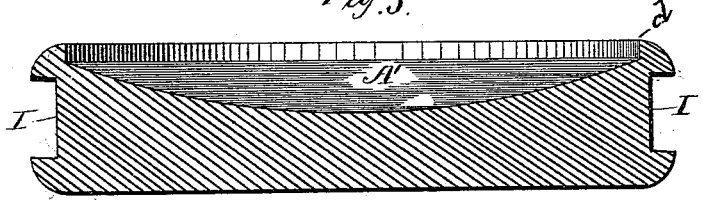

A represents a circular wooden block having a concave or dish-shaped face on one side and a flat surface and beveled periphery on its opposite face. Its concave or dish-shaped face serves as a receptacle for domestic articles of food placed therein, and to this end the inner periphery of its dish-shaped face is to a slight extent vertical, as shown in Fig. 3, whereby greater depth of the dish is attained, and its capacity to hold articles employed in the culinary preparation of food is enlarged. The perpendicular wall $d$ also serves to prevent fluid articles being spilled over the side of the dish during the process of compounding the same. The flat surface and beveled periphery of the opposite face serve admirably as a chopping-block for chopping and cutting purposes.

In order that the block may be more conveniently handled, especially in emptying semi-fluid contents from the dish A', I provide the circular recess I therein. Into this recess on the periphery of the block I secure the metallic plate $e$ by screwing it to the block, and in the center of plate $e$ the eye-screw or staple $f$ and ring $g$, as shown, which together form a suitable means of suspending the device to the pantry-wall when not in use.

Thus constructed a durable and efficient culinary utensil is produced at little cost.

Having thus described my invention, what I desire to secure by Letters Patent is—

As a new article of manufacture, the circular culinary block A, having a dish concavity, A', on one face, a culinary chopping-block on its opposite face, and a recess on its periphery, substantially as shown, and for the purpose described.

In testimony whereof I affix my signature in presence of two witnesses.

LEVI HAAS.

Witnesses:
   I. E. COCHRAN, Jr.,
   H. S. MCILVAIN.